US012729127B2

(12) United States Patent
Nagai et al.

(10) Patent No.: US 12,729,127 B2
(45) Date of Patent: Sep. 8, 2026

(54) FINE-PARTICLE POWDER CONTAINING CALCIUM OXIDE OR CALCIUM HYDROXIDE AND PRODUCTION METHOD FOR SAME

(71) Applicant: Panasonic Intellectual Property Management Co., Ltd., Osaka (JP)

(72) Inventors: Hisao Nagai, Osaka (JP); Hiroki Maruyama, Osaka (JP); Takeshi Koiwasaki, Osaka (JP); Takafumi Okuma, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 548 days.

(21) Appl. No.: 18/337,804

(22) Filed: Jun. 20, 2023

(65) Prior Publication Data

US 2023/0331573 A1 Oct. 19, 2023

Related U.S. Application Data

(63) Continuation of application No. PCT/JP2021/043607, filed on Nov. 29, 2021.

(30) Foreign Application Priority Data

Jan. 15, 2021 (JP) ................................. 2021-005244

(51) Int. Cl.
*C01F 11/04* (2006.01)
*C08K 7/18* (2006.01)

(52) U.S. Cl.
CPC ................ *C01F 11/04* (2013.01); *C08K 7/18* (2013.01); *C01P 2004/51* (2013.01);
(Continued)

(58) Field of Classification Search
None
See application file for complete search history.

(56) References Cited

U.S. PATENT DOCUMENTS 5,851,507 A 12/1998 Pirzada et al.
2007/0082978 A1 * 4/2007 Suzuki ...................... C09C 1/02
523/210

(Continued)

FOREIGN PATENT DOCUMENTS

JP 02-026810 1/1990
JP 09-262460 10/1997

(Continued)

OTHER PUBLICATIONS

International Search Report of PCT application No. PCT/JP2021/043607 dated Dec. 21, 2021.

(Continued)

*Primary Examiner* — John J Figueroa
(74) *Attorney, Agent, or Firm* — Wenderoth, Lind & Ponack, L.L.P.

(57) ABSTRACT

A method for producing a fine-particle powder containing calcium oxide or calcium hydroxide includes: preparing a pulverized powder of shells or eggshells; introducing the pulverized powder of shells or eggshells into a controlled atmosphere, vaporizing the pulverized powder under thermal plasma and then solidifying the pulverized powder in a gas phase to produce fine particles containing calcium oxide or calcium hydroxide; and collecting a powder of the fine particles containing calcium oxide or calcium hydroxide produced with the thermal plasma.

7 Claims, 5 Drawing Sheets

(TABLE 1)

| | REACTION TIME (sec) | | | |
|---|---|---|---|---|
| | 0 | 20 | 60 | 180 |
| TEMPERATURE (°C) | 27.3 | 27.4 | 27.5 | 27.7 |
| pH | 12.11 | 12.09 | 12.08 | 12.07 |
| VIABLE CELL COUNT (PER 1 mL) | $1.8 \times 10^7$ | $9.2 \times 10^6$ | $5.4 \times 10^6$ | $1.3 \times 10^2$ |
| VIABLE CELL COUNT/ INITIAL CELL COUNT | 1 | $5.1 \times 10^{-1}$ | $3.0 \times 10^{-1}$ | $7.2 \times 10^{-6}$ |

(52) U.S. Cl.
CPC ...... *C01P 2004/62* (2013.01); *C01P 2004/64* (2013.01); *C01P 2006/12* (2013.01); *C08K 2201/005* (2013.01); *C08K 2201/006* (2013.01)

(56) References Cited

U.S. PATENT DOCUMENTS

| | | | | |
|---|---|---|---|---|
| 2009/0246524 | A1* | 10/2009 | Ohmi | C01F 11/02 423/640 |
| 2010/0040655 | A1 | 2/2010 | Ren et al. | |
| 2010/0196239 | A1* | 8/2010 | Dumont | B01J 20/041 524/436 |
| 2018/0155240 | A1* | 6/2018 | Chini | C04B 2/04 |
| 2019/0389735 | A1* | 12/2019 | Aubry | B01J 20/28059 |
| 2020/0087158 | A1* | 3/2020 | LaMar | C01F 11/18 |

FOREIGN PATENT DOCUMENTS

| | | |
|---|---|---|
| JP | 10-279301 | 10/1998 |
| JP | 2004-206997 | 7/2004 |
| JP | 2005-343754 | 12/2005 |
| JP | 2007-031212 | 2/2007 |
| JP | 2009-526828 | 7/2009 |
| JP | 2011-073896 | 4/2011 |
| JP | 2012-055840 | 3/2012 |
| JP | 2014-014801 | 1/2014 |
| JP | 2017-193617 | 10/2017 |
| JP | 2019-077648 | 5/2019 |
| JP | 2019-214633 | 12/2019 |
| JP | 2020-200278 | 12/2020 |

OTHER PUBLICATIONS

Sawai Jun, Agriculture and Horticulture, vol. 94, No. 11, P956, 2019.

Murata Ayumi, et al., Journal of Nursing Society, University of Toyama, vol. 7, No. 2, p39, 2008.

* cited by examiner 20
1
3
6
7
PUMP
18
31
15
16
17
8
31
5-1
4
5-2
12
2
14
5-3
30
11
GAS
5-6
10
31

FIG. 5

(TABLE 1)

| | REACTION TIME (sec) | | | |
|---|---|---|---|---|
| | 0 | 20 | 60 | 180 |
| TEMPERATURE (°C) | 27.3 | 27.4 | 27.5 | 27.7 |
| pH | 12.11 | 12.09 | 12.08 | 12.07 |
| VIABLE CELL COUNT (PER 1 mL) | $1.8 \times 10^{7}$ | $9.2 \times 10^{6}$ | $5.4 \times 10^{6}$ | $1.3 \times 10^{2}$ |
| VIABLE CELL COUNT/ INITIAL CELL COUNT | 1 | $5.1 \times 10^{-1}$ | $3.0 \times 10^{-1}$ | $7.2 \times 10^{-6}$ |

FINE-PARTICLE POWDER CONTAINING CALCIUM OXIDE OR CALCIUM HYDROXIDE AND PRODUCTION METHOD FOR SAME

TECHNICAL FIELD

The present invention relates to fine-particle powder containing calcium oxide or calcium hydroxide with an antibacterial effect, and a method for producing a fine-particle powder containing calcium oxide or calcium hydroxide. Fine-particle powder containing calcium oxide or calcium hydroxide is useful as an antibacterial material to be contained in resin products used in, for example, sheets for prevention of droplet infection such as face shields used as a countermeasure for coronavirus, tableware such as chopsticks and spoons, and film materials for food packaging. A resin composition containing fine-particle powder containing calcium oxide or calcium hydroxide as an antibacterial material can be used in protective films of touch panels of electronic devices such as smartphones, and the like.

BACKGROUND ART

In fiscal 2018, the amount of scallops landed in Japan is about 480,000 tons, of which about 80% is shells, most of which are treated as waste. Various effective uses of shells have been attempted, but it is said that only the same uses as limestone have been attempted. Environmental problems such as foul odors from piles of shells, which are waste, and soil contamination with the piles of shells have become serious, and it is necessary to develop new ways to use shells.

The main component of scallop shells is calcium carbonate ($CaCO_3$), which is used as a food additive to supplement calcium, a fluidity improver for printing inks, a strength reinforcing material for plastics and rubbers, and the like. By subjecting the shell powder to a heat treatment at a high temperature of equal to or more than 700° C. for several hours, calcium carbonate ($CaCO_3$) changes to calcium oxide (CaO) as carbon dioxide is eliminated. The powder mainly composed of calcium oxide that has undergone such a high-temperature sintering step is called calcined scallop shell powder, and has a strong antibacterial activity. When the calcined scallop shell powder is formed into a slurry, the main component, calcium oxide (CaO), reacts with water to form calcium hydroxide ($Ca(OH)_2$). This calcined scallop shell powder slurry also has a strong antibacterial action, and is reported to exhibit high antibacterial activity against *Escherichia coli, Staphylococcus aureus*, and durable *Bacillus subtilis* spores (for example, see Non-Patent Literature 1).

In other words, it is considered that the main factor of sterilization mechanism is that an alkaline aqueous solution is obtained as calcium oxide slightly dissolves in water and the sterilization action is acquired by the high pH. An antibacterial effect is exhibited by sintering at a high temperature of equal to or more than 700° C., but the antibacterial effect becomes stronger as the sintering temperature rises, and it has been confirmed that the powder calcined at 1000° C. has almost the same antibacterial activity as that of commercially available calcium oxide powder slurries. High sintering treatment at equal to or more than 1000° C. is required to be conducted for several hours to produce calcined shell powder having a strong antibacterial effect.

Calcined scallop shell powder has been confirmed to have an antibacterial effect against viruses such as influenza virus, and Non-Patent Literature 2 reports that the antibacterial effect is 1,000 times higher in particle powder having a relatively small particle size (average particle size of 3.5 micrometers) than in particle powder having a large particle size (average particle size of 18.4 micrometers). As described above, in general, as the particle size of the antibacterial material is smaller, that is, as the specific surface area increases, the antibacterial effect tends to be stronger, and it is thus desired to decrease the particle size of antibacterial materials.

In a case of fabricating plastic and resin products having an antibacterial effect, antibacterial materials are kneaded before resin raw materials are molded. The color of final resin molded products is also affected by the color of the added antibacterial particle powder. For this reason, in order not to affect the color of final resin molded products, the added antibacterial particles are desired to be small and have a particle shape that is easily dispersed. In particular, in recent years, in a case of imparting an antibacterial effect to coatings and pasted resin films on touch panels, such as transparent resin sheets for prevention of droplet infection used as a countermeasure for coronavirus and transparent resin films used for food packaging, added antibacterial particles are desired to be fine particles in order to maintain the transparency of final products.

In a case of fabricating transparent plastic sheets and resin films to which antibacterial materials are added, it is necessary to produce the antibacterial materials in large quantities at a low cost. From the viewpoint of the resin kneading step, it is preferable to use dry particles rather than a slurry in which particles are dispersed in a solution. In a case where slurries and the like are used, various additional steps such as waste liquid treatment and drying are required, and it also takes a long time for the treatment. Furthermore, in the case of using slurries, the dispersants and slurry solvents introduced so that the particles are not aggregated together become contaminations (impurities) during resin kneading, which are causes of a decrease in the strength of final resin-molded products and the deterioration of antibacterial effect.

As general methods for decreasing the particle size of materials, there are jet milling in which the raw material is blown with a high-speed air current to cause the powders to collide with each other and form fine particles and bead milling in which a bulk material as a raw material is introduced together with beads such as ceramic or zirconia and the material is formed into fine particles by mechanical pulverization. However, Patent Literature 1 describes that it is the current situation that the average particle size is limited to 1.5 microns in mechanical pulverization such as jet milling and calcium hydroxide having an average particle size of 3 micrometers is obtained even when ball milling or the like, which is wet pulverization having high pulverization efficiency and capable of advanced pulverization, is used. For this reason, in such a mechanical pulverization method, the average particle size is limited to a micron or submicron order, and it is difficult to pulverize calcium oxide and calcium hydroxide, which are pulverized shell powders, into fine particles in a nanometer order (less than or equal to 100 nanometers).

As another method for decreasing the particle size, there is atomization in which the material is melted and injected into air or water. However, since the calcium oxide in the calcined shell powder has a high melting point of 2613° C., maintaining the material in a molten state is energy inefficient. The atomization can generally form fine particles of submicrons, but it is difficult to form fine particles of less than or equal to 100 nanometers by atomization.

FIG. 6A illustrates a circulation flow chart of the method for producing ultrafine particles of calcium hydroxide of Conventional Example 1.

In Conventional Example 1, a slurry of calcium hydroxide having an average particle size of 20 μm, which is a raw material, is introduced into slurry tank 102. In slurry tank 102, the slurry is sent to wet pulverizer 101 using circulation pump 103 while being stirred by stirrer 104. Since circulation operation is performed, pulverization of calcium hydroxide progresses continuously with the pulverization time, and the particle size can be controlled. An additive that suppresses dispersion, and the like can be added from slurry tank 102.

FIG. 6B illustrates a configuration example of wet pulverizer 101. Wet pulverizer 101 has disk-shaped stirring unit 108 having a rotation shaft at the internal center of pulverization chamber 107. Microbeads having a diameter of 0.03 mm to 2 mm as grinding media are filled in pulverization chamber 107 at approximately 60% to 95%. This wet pulverizer 101 has a configuration in which slurry of calcium hydroxide is introduced from slurry inlet 105 and beads and the slurry of calcium hydroxide are stirred and pulverized in stirring unit 108 and discharged from slurry outlet 106. It is configured that the microbeads in pulverization chamber 107 are separated from the stirred and pulverized slurry of calcium hydroxide and only the slurry is circulated by attaching gap separator 109 in front of slurry outlet 106.

CITATION LIST

Patent Literature

PTL 1: Unexamined Japanese Patent Publication No. 2007-31212 Non-Patent Literatures NPL 1: SAWAI Jun, Agriculture and Horticulture, Vol. 94, No. 11, P956, 2019

NPL 2: MURATA Ayumi, et al., Journal of Nursing Society, University of Toyama, Vol. 7, No. 2, p 39, 2008

SUMMARY OF THE INVENTION

A method for producing a fine-particle powder containing calcium oxide or calcium hydroxide according to an aspect of the present invention includes: preparing a pulverized powder of shells or eggshells; introducing the pulverized powder of shells or eggshells into a controlled atmosphere, vaporizing the pulverized powder under thermal plasma and then solidifying the pulverized powder in a gas phase to produce fine particles containing calcium oxide or calcium hydroxide; and collecting a powder of the fine particles containing calcium oxide or calcium hydroxide produced with the thermal plasma.

A fine-particle powder according to an aspect of the present invention contains calcium oxide or calcium hydroxide, the fine-particle powder includes particles having a particle size of primary particles of from 5 nm to 300 nm inclusive, and a specific surface area of entire particle powder is equal to or more than 18 $m^2/g$.

BRIEF DESCRIPTION OF THE DRAWINGS

FIG. 5 is Table 1 illustrating the results of an antibacterial test of a fine-particle powder produced by a method for producing a fine-particle powder containing calcium oxide or calcium hydroxide according to a first exemplary embodiment.

DESCRIPTION OF EMBODIMENT

Figure 1:
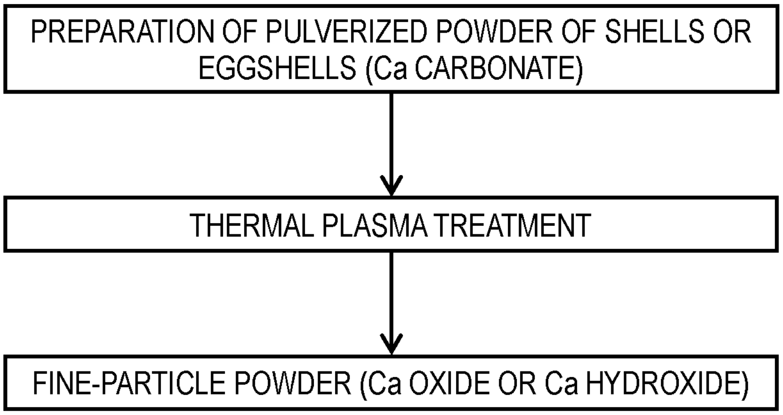
FIG. 1 is a flow chart of a method for producing a fine-particle powder containing calcium oxide or calcium hydroxide according to a first exemplary embodiment.

In Conventional Example 1 above, the fine particles of calcium hydroxide having an average particle size of less than or equal to 0.5 micrometers are formed using a slurry of calcium hydroxide by wet mechanical pulverization having high pulverization ability. A slurry of calcium hydroxide exhibiting stable dispersibility for equal to or more than 1400 hours is produced by adding a carboxylate-based polymer compound as a dispersant, a nonionic wetting agent, and the like.

However, fine particles produced by the method for producing fine particles described above still have a too large particle size in order to be kneaded into a transparent resin sheet for prevention of droplet infection, a transparent resin film used for food packaging, and the like, and to maintain transparency. In order to maintain transparency when fine particles are kneaded into resins or applied on films, it is necessary to disperse fine particles of less than or equal to 100 nanometers. For further micronization, even if mechanical pulverization is performed for a long time, the antibacterial effect may deteriorate by mixing of contaminations (impurities) due to microbeads used as a pulverizing medium and compositional deviation due to mechanical pulverization. Furthermore, as a slurry is formed, when fine particles are kneaded into resins, the number of steps such as drying and waste liquid treatment increases and the production cost increases as well as the antibacterial effect may deteriorate by residual solvents and dispersants.

In consideration of the conventional problems described above, an object of an aspect of the present invention is to provide a method for producing a fine-particle powder containing calcium oxide or calcium hydroxide by which a fine-particle powder containing calcium oxide or calcium hydroxide exhibiting high antibacterial activity can be efficiently produced using a pulverized shell material in a dry environment, and the fine-particle powder.

A method for producing a fine-particle powder containing calcium oxide or calcium hydroxide according to a first aspect includes: preparing a pulverized powder of shells or eggshells; introducing the pulverized powder of shells or eggshells into a controlled atmosphere, vaporizing the pulverized powder under thermal plasma and then solidifying the pulverized powder in a gas phase to produce fine particles containing calcium oxide or calcium hydroxide; and collecting a powder of the fine particles containing calcium oxide or calcium hydroxide treated with thermal plasma.

A method for producing a fine-particle powder containing calcium oxide or calcium hydroxide according to a second aspect is that the controlled atmosphere may contain argon gas and further at least one selected from the group consisting of oxygen gas, hydrogen gas, and water vapor in the first aspect.

A method for producing a fine-particle powder containing calcium oxide or calcium hydroxide according to a third aspect is that water is used when the pulverized powder of shells or eggshells is introduced into the controlled atmosphere in the first aspect.

A fine-particle powder containing calcium oxide or calcium hydroxide according to a fourth aspect includes particles having a particle size of primary particles of from 5 nm to 300 nm inclusive, and a specific surface area of the entire particle powder is equal to or more than 18 $m^2/g$.

A resin composition according to a fifth aspect contains the fine-particle powder containing calcium oxide or calcium hydroxide according to the fourth aspect in a resin.

A resin molded body according to a sixth aspect contains the fine-particle powder containing calcium oxide or calcium hydroxide according to the fourth aspect in a resin.

A resin molded body of a sheet form according to a seventh aspect contains the fine-particle powder containing calcium oxide or calcium hydroxide according to the fourth aspect in a resin.

By the method for producing a fine-particle powder containing calcium oxide or calcium hydroxide according to an aspect of the present invention, it is possible to produce calcined shell fine-particle powder containing calcium oxide or calcium hydroxide as a main component, which has an average particle size of less than or equal to 100 nanometers and exhibits high antibacterial activity, from pulverized shell powder (mainly calcium carbonate), which is waste, without using a solution. High-temperature calcination at 1000° C. for 1 to 3 hours using a conventional electric furnace has been required, but it is possible to perform a treatment by thermal plasma at a high temperature (approximately 10,000° C.) in a significantly short time (several milliseconds) by using thermal plasma in the step of calcining pulverized powder of shells and the like, and a fine-particle powder having a high antibacterial effect can be produced. Since a slurry and a solution are not used, a drying step and a waste liquid treatment step are not required, and the resin kneading step may be simplified. As a result, the material treatment time is greatly decreased, a large amount of material can be treated, thus it is possible to increase the amount of fine particles produced and provide a method for producing a fine-particle powder of an antibacterial material at a low cost.

Hereinafter, a method for producing a fine-particle powder containing calcium oxide or calcium hydroxide according to an exemplary embodiment, and a fine-particle powder containing calcium oxide or calcium hydroxide, which is obtained by the method, will be described in detail with reference to the drawings.

First Exemplary Embodiment

FIG. 1 is a flow chart of a method for producing a fine-particle powder containing calcium oxide or calcium hydroxide according to a first exemplary embodiment. The main production flow includes a step of preparing a pulverized powder of shells or eggshells, a step of performing thermal plasma treatment, a step of collecting the produced fine-particle powder.

The method for producing a fine-particle powder containing calcium oxide or calcium hydroxide according to the first exemplary embodiment includes significantly simple dry steps, but it is possible to produce a nanometer-sized calcined shell fine-particle powder (fine-particle powder containing mainly calcium oxide) or a fine-particle powder containing calcium hydroxide from a shell powder (calcium carbonate) having a particle size of several micrometers by including the step of performing thermal plasma treatment.

<Fine Particle Production Apparatus>

Figure 2:
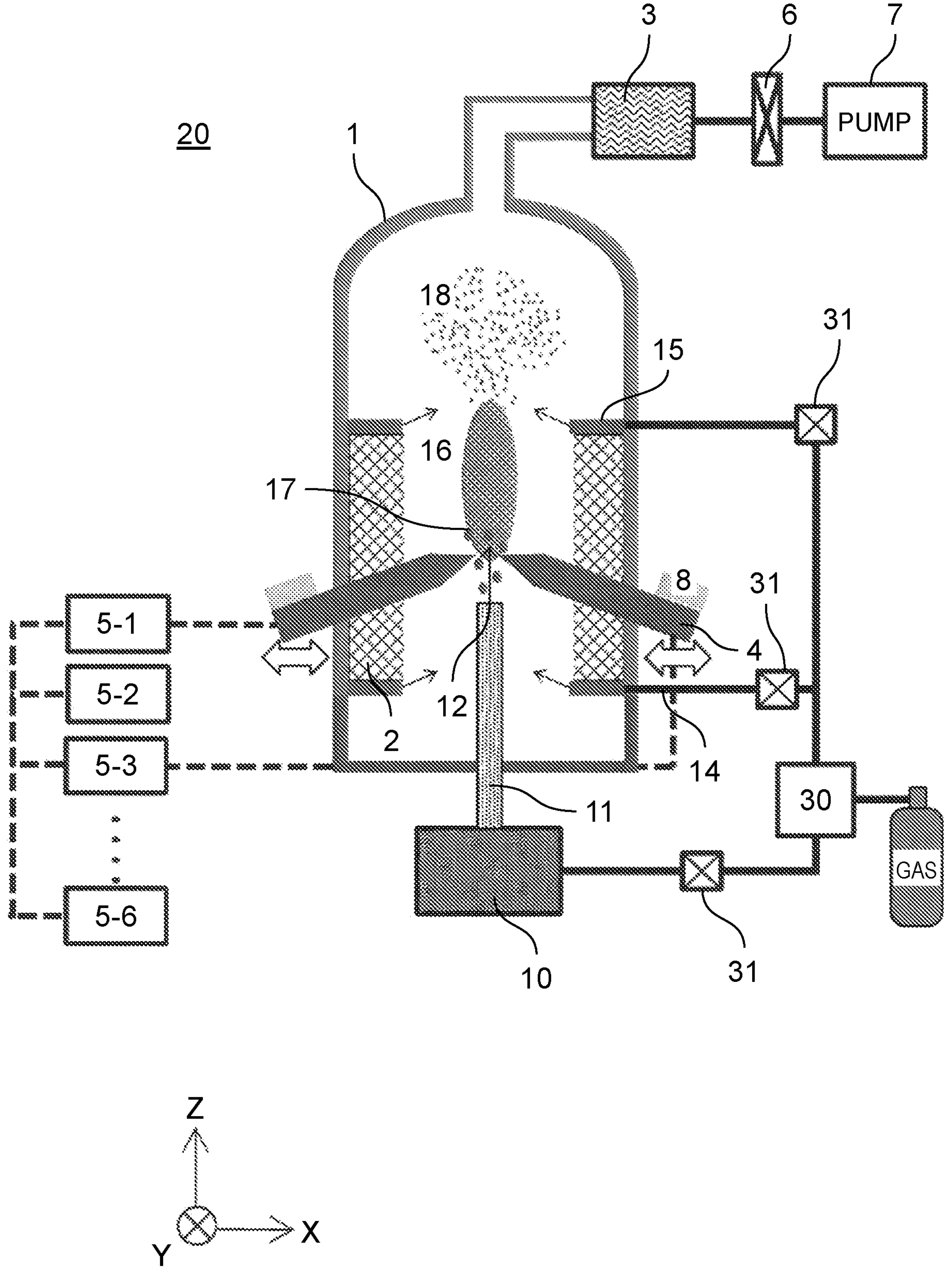
FIG. 2 is a schematic sectional view illustrating the sectional configuration of a fine particle production apparatus according to a first exemplary embodiment.

FIG. 2 is a schematic sectional view illustrating the sectional configuration of fine particle production apparatus 20 according to the first exemplary embodiment. For the sake of convenience, the vertically upward direction is taken as the Z direction, the direction from left to right on the paper surface in the horizontal plane is taken as the X direction, and the direction from the front to the back of the paper surface is taken as the Y direction. With reference to FIG. 1, a multiphase AC arc plasma treatment will be described as an example of thermal plasma treatment for producing nanometer-order fine particles of calcined shell fine-particle powder.

Fine particle production apparatus 20 used in the first exemplary embodiment is equipped with at least reaction chamber 1 as an example of a reaction chamber, material supply apparatus 10, six electrodes 4 that generate arc discharge (thermal plasma) 16, and fine particle collection unit 3 for collecting generated fine particles 18, and generates arc discharge 16 in reaction chamber 1 to produce fine particles 18 from material particles 17.

Furthermore, in fine particle production apparatus 20 of the first exemplary embodiment, in addition to the configuration, material supply pipe 11 is installed, and discharge gas supply pipe 14 for controlling the flow of the raw material gas that is the vaporized material and cooling gas supply pipe 15 for cooling the vaporized raw material gas are installed above and below thermal insulating member 2. Pressure adjustment valve 6 and exhaust pump 7 are provided at the rear stage of fine particle collection unit 3 to adjust the pressure in reaction chamber 1.

Furthermore, in fine particle production apparatus 20 of the first exemplary embodiment, in addition to the configuration, each discharge gas supply pipe 14 has an opening disposed on the lower side (−Z direction) of reaction chamber 1 than material supply port 12 to supply discharge gas from gas supply apparatus 30 via gas flow rate adjuster 31. Electrodes 4 are connected to AC power sources 5-1 to 5-6 that apply AC power, respectively, and are configured to be movable back and forth in the radiation direction (radial direction) with respect to the center of reaction chamber 1 by electrode drive device 8 composed of a motor and the like.

<Method for Producing Fine-Particle Powder Containing Calcium Oxide or Calcium Hydroxide>

The method for producing a fine-particle powder containing calcium oxide or calcium hydroxide using the fine particle production apparatus according to the configuration described above includes a step of preparing pulverized powder of shells or eggshells, a step of performing thermal plasma treatment, a step of collecting the produced fine-particle powder as described above. In particular, the step of performing thermal plasma treatment includes at least three steps of:

i) generating thermal plasma 16;

ii) supplying material particles 17 into thermal plasma 16; and iii) generating fine particles 18.

First, in i) the step of generating thermal plasma 16, in reaction chamber 1, AC powers having different phases from each other are applied to electrodes 4 disposed in the flow direction (Z direction) of material particles 17, respectively, to generate vertically long thermal plasma 16 in the direction in which material particles 17 flow (that is, from bottom to top: Z direction).

Next, in ii) the step of supplying material particles 17 into thermal plasma 16, material particles 17 are supplied from material supply port 12 of material supply apparatus 10 into the region of thermal plasma 16.

Next, in iii) the step of generating fine particles 18, material particles 17 evaporate or vaporize into a material gas as material particles 17 pass through the region of thermal plasma 16, and the material gas is rapidly cooled as soon as the material gas escapes from the region of thermal plasma 16 and fine particles 18 are generated.

Hereinafter, this step of performing thermal plasma treatment in the method for producing a fine-particle powder containing calcium oxide or calcium hydroxide will be described in detail along with the actual production procedure of a calcined shell fine-particle powder.

First, (1) reaction chamber 1, fine particle collection unit 3, and material supply apparatus 10 are evacuated to several tens of Pa by exhaust pump 7 to diminish the effects of oxygen and moisture in the air.

Next, (2) gas is supplied from gas supply apparatus 30 to material supply apparatus 10, discharge gas supply pipe 14, and cooling gas supply pipe 15 via gas flow rate adjuster 31, and the pressure in reaction chamber 1 is adjusted by pressure adjustment valve 6 attached to the front stage of exhaust pump 7. Gas is supplied from a plurality of supply ports of discharge gas supply pipe 14 on the lower side of reaction chamber 1.

(3) Gas is supplied from a plurality of supply ports of cooling gas supply pipe 15 on the upper side of reaction chamber 1 into reaction chamber 1, and the cooling gas is ejected vertically upward by 30° from the horizontal plane and in the normal direction from the horizontal plane to efficiently cool the gas evaporated and vaporized by arc discharge 16 and control the particle size of fine particles 18 to be produced.

(4) In one Example of this first exemplary embodiment, in order to produce a calcined shell fine-particle powder, argon gas was supplied from gas supply apparatus 30 into reaction chamber 1 via discharge gas supply pipe 14 and cooling gas supply pipe 15, respectively, and the inside of reaction chamber 1 was maintained at a desired pressure of from 0.3 atm to 1.0 atm (atmospheric pressure) inclusive in an inert gas atmosphere containing argon to perform the following fine particle production step.

Here, argon, which is an inert gas, is used as the discharge gas and the cooling gas. In order to promote the removal of carbon and elimination of carbon dioxide from the shell material, hydrogen gas, oxygen gas, or water mist may be introduced from gas supply apparatus 30 into reaction chamber 1 via discharge gas supply pipe 14 and cooling gas supply pipe 15. By this, impurity carbon can be efficiently removed, the purity of the produced fine particles can be increased, and the antibacterial effect can be enhanced. The argon gas atmosphere may be mixed with a small amount of carbonaceous gas such as methane gas. Since the surface is coated with a carbon film by this, it can be expected that the compatibility of the calcined shell fine particles to be produced with the resin is improved and the life of the antibacterial material is extended.

Next, (5) arc discharge 16 (in other words, thermal plasma) is generated. With regard to metal electrode 4 that generates arc discharge 16, as illustrated in FIG. 2, six electrodes 4 are radially disposed on the circumferential wall of reaction chamber 1 at intervals of 60° with the tip protruding in reaction chamber 1 in the lateral direction (for example, electrode 4 is vertically upward by 30° to the horizontal direction). The number of electrodes is not limited to six, and may be eight or twelve. As illustrated in FIG. 2, the electrodes are not limited to the case of one stage, and may be provided at two stages.

AC power with a phase shift is applied from AC power source 5 to the respective electrodes 4 adjacent to each other. As an example, AC power of 60 Hz having phases shifted by 60° from each other is applied to six electrodes 4 from AC power source 5 to generate vertically long arc discharge 16, which is thermal plasma of about 10000° C.

When arc discharge 16 is ignited after the application of AC power, arbitrary two electrodes 4 are moved toward the center of reaction chamber 1 by electrode drive device 8. After arc discharge 16 is ignited, the current applied to each electrode 4 is adjusted to be constant, each electrode 4 is moved in the radiation direction (outward direction from the center position of the circle formed by the tips of radially disposed electrodes 4) by electrode drive device 8 to bring each of electrodes 4 to the desired position.

Next, (6) supply of the material to be treated is started. As an example, material particles 17, which are the raw material of fine particles 18, are placed in material supply apparatus 10 using pulverized scallop shell powder having a particle size of about 5.4 micrometers. With regard to the average particle size of material, the particle size distribution has been measured by a diffraction or scattering method using a laser, and the median size has been taken as the average particle size. In First Example, particles having a particle size of 5.4 micrometers were used, but it is possible to evaporate particles by thermal plasma 16 and produce nanometer-order fine particles 18 as long as the particles have a particle size of less than or equal to 100 microns although it also depends on the thermal plasma conditions. When a material having a particle size larger than 100 micrometers is used, the material cannot be completely evaporated and the generated fine particles may have a large particle size of a micrometer order in some cases.

In this Example, pulverized scallop shell powder was used as a pulverized shell powder, but the pulverized shell powder is not limited to this, and for example, pulverized shell powders of shells such as oysters, short-necked clams and surf clams containing calcium carbonate as a main component may be used. In addition to pulverized shell powders, eggshells, snail shells and the like can also be used since the main component thereof is calcium carbonate.

As an example of material supply apparatus 10, a quantitative powder supply apparatus has been used. In this quantitative powder feeder, a fixed amount of powder material is supplied to a groove such as a hopper by the flow rate of carrier gas and the rotation speed of the vessel into which the material is introduced, and the supply amount is controlled by sucking the powder material with the carrier gas, whereby the powder material can be sent to material supply pipe 11 at a constant proportion.

In the first exemplary embodiment, a quantitative powder feeder has been used as material supply apparatus 10, but a pulverized shell powder as a raw material may be stirred in water, and the pulverized shell powder dispersed in a liquid may be supplied into thermal plasma 16 using a liquid pump. At that time, material supply port 12 is changed to a one-fluid nozzle or a two-fluid nozzle. As a pulverized shell powder dispersed in water is used, water and shells are evaporated at the same time by thermal plasma, and a calcined shell fine-particle powder mainly composed of calcium hydroxide can be obtained in the gas phase. A calcined shell fine-particle powder mainly composed of calcium oxide or a calcined shell fine-particle powder mainly composed of calcium hydroxide may be selected depending on the antibacterial use.

In this case, water is used as a carrier medium for the raw material and as a reactant into calcium hydroxide, but since the water evaporates as soon as it is supplied to thermal plasma, the reaction takes place in the gas phase containing few impurities.

As water is used, additional steps such as subsequent drying and liquid waste steps are not required, and resin kneading can be performed at a low cost as in the case of using gas.

(7) As illustrated in FIG. 2, material particles 17 are sent from material supply apparatus 10 to material supply pipe 11 and introduced into reaction chamber 1 from material supply port 12.

(8) Material particles 17 introduced into reaction chamber 1 evaporate and vaporize when passing through arc discharge 16, and material particles 17 are gasified.

(9) Finally, as illustrated in FIG. 2, fine particles 18 generated by arc discharge 16 are transported to fine particle collection unit 3 by the flow of gas from discharge gas supply pipe 14, the ascending current caused by arc discharge 16, or the flow caused by gas exhaust. Although not illustrated, fine particle collection unit 3 is equipped with a bag filter capable of collecting fine-particle powder having a desired particle size range.

By these processes described above, it is possible to collect a powder of calcined shell fine particles having a particle size of, for example, from 5 nm to 300 nm inclusive from the bag filter.

Figure 3:
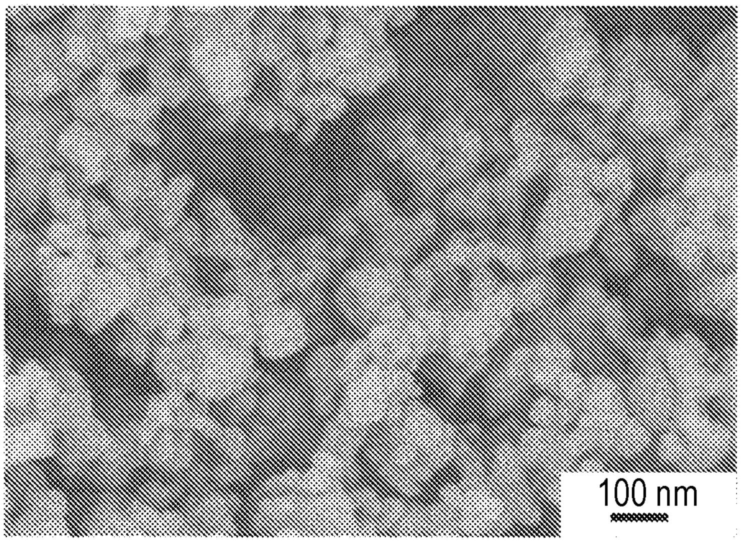
FIG. 3 is a SEM image of fine-particle powder produced by a method for producing a fine-particle powder containing calcium oxide or calcium hydroxide according to a first exemplary embodiment.

A scanning electron microscope (SEM) image of fine particles produced from pulverized scallop shell powder by the method for producing a fine-particle powder containing calcium oxide or calcium hydroxide according to the first exemplary embodiment is illustrated in FIG. 3. It has been confirmed that most of the produced particles are nanoparticles having a particle size of less than or equal to 100 nanometers while the average particle size of the pulverized shell powder, which is the raw material, is 5.4 micrometers. The fine particles constituting the obtained fine-particle powder are spherical particles having a smooth surface shape, and particles having cracked shapes, angular shapes, cracks, and uneven and distorted shapes, which are peculiar to the mechanically pulverized particles, have not been observed. It may be presumed that the obtained fine-particle powder exhibits higher dispersibility than the mechanically pulverized particle powder in the resin kneading step because of this smooth surface shape. The specific surface area of this sample analyzed by the BET method by gas adsorption using nitrogen gas is 23.7 $m^2/g$. The average particle size of primary particles calculated from this specific surface area is about 76 nanometers, and is confirmed not to be significantly different from the number average particle size calculated from the SEM image illustrated in FIG. 3. When the specific surface area is measured by changing the thermal plasma treatment conditions, the specific surface area increases up to 55.7 $m^2/g$ depending on the conditions, and the particles can be micronized to have a calculated average particle size of primary particles of about 32 nanometers.

<Fine-Particle Powder Containing Calcium Oxide or Calcium Hydroxide>

It is desirable that the primary particles of the fine particles containing calcium oxide or calcium hydroxide according to the first exemplary embodiment have a size of from 5 nm to 300 nm inclusive, and the specific surface area of the entire powder is equal to or more than 18 $m^2/g$. This is a size in which the average particle size of primary particles is less than or equal to 100 nanometers and the transparency is maintained when the particles are kneaded into a transparent resin.

Figure 4:
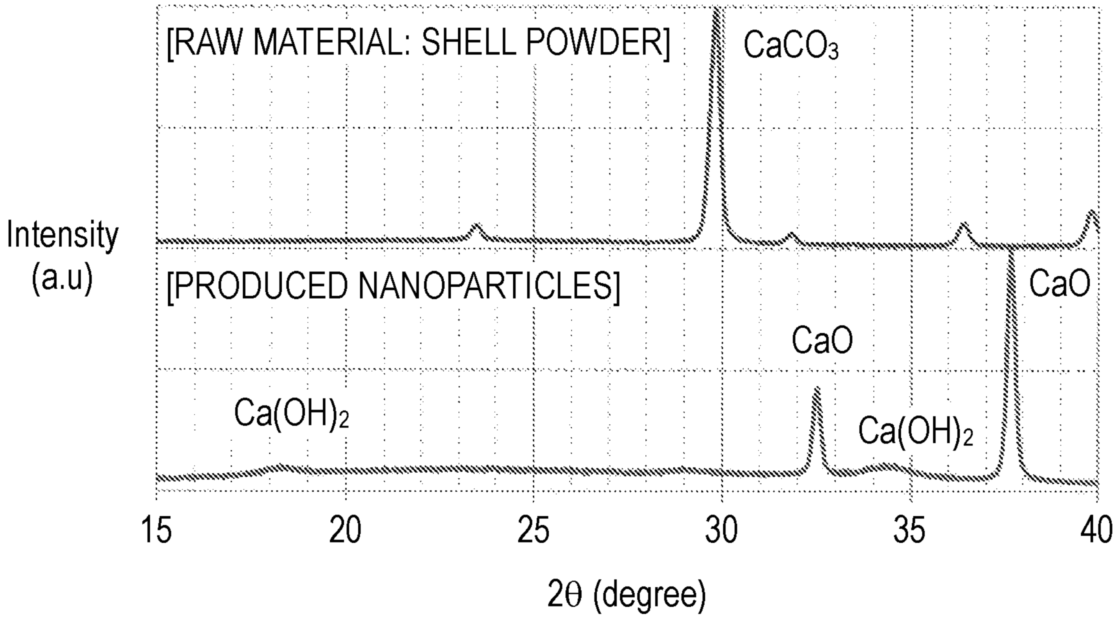
FIG. 4 is a diagram illustrating X-ray diffraction spectra of a material used in a method for producing a fine-particle powder containing calcium oxide or calcium hydroxide according to a first exemplary embodiment and a fine-particle powder produced using thermal plasma.
Figure 6A:
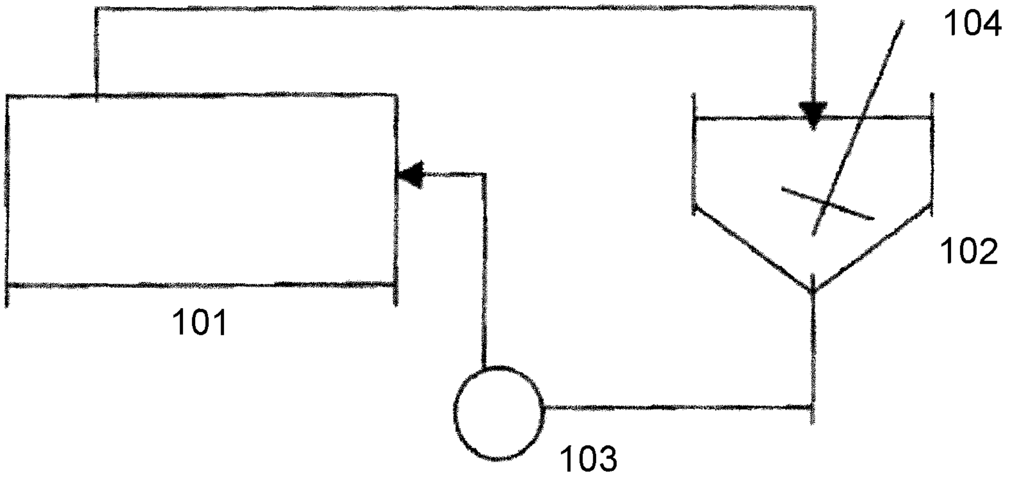
FIG. 6A is a circulation flow chart of a method for producing ultrafine particles of calcium hydroxide described in Conventional Example 1.
Figure 6B:
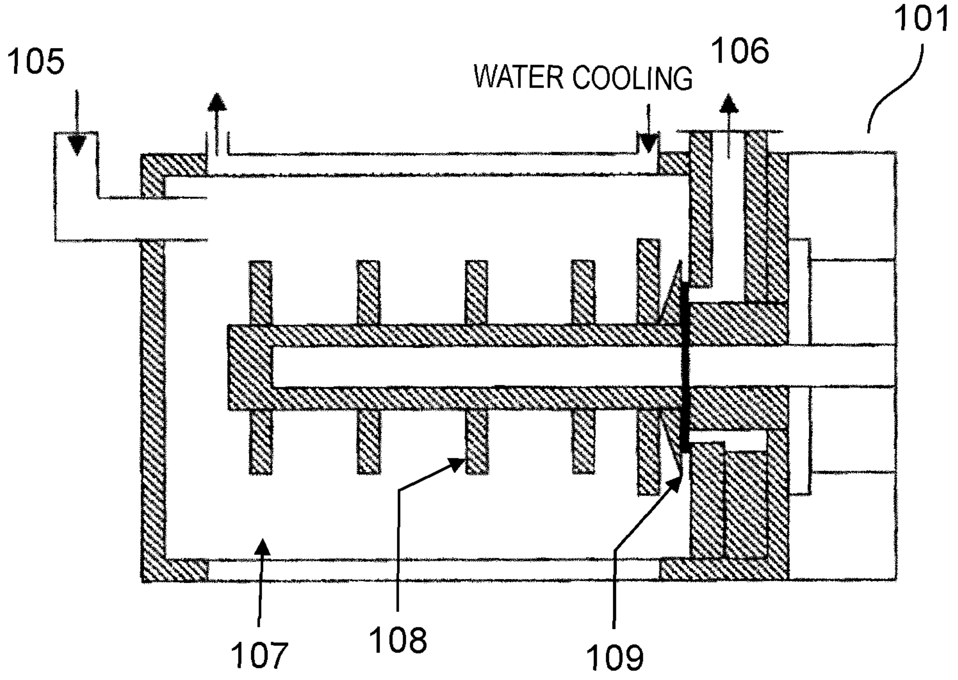
FIG. 6B is a schematic view illustrating a configuration example of a wet pulverizer described in Conventional Example 1.

The X-ray diffraction spectra of the material used in the method for producing a fine-particle powder containing calcium oxide or calcium hydroxide according to the first exemplary embodiment and particles produced by thermal plasma are illustrated in FIG. 4. In the X-ray diffraction spectrum of the pulverized shell powder as the raw material, there is a large peak at the diffraction angle 2θ of 29.6°, and as a result of investigation from the arrangement of other peaks, the pulverized shell powder has a calcite structure, which is a stable structure of calcium carbonate. The X-ray diffraction spectrum of the produced nanoparticles is a completely different spectrum, and the main component of the produced particles is calcium oxide having a peak at 2θ of 37.6°. A slightly broad peak attributed to calcium hydroxide is also identified at 2θ of near 34.4°. It is presumed that this is because calcium oxide having a small particle size and high surface activity reacts with moisture in the air to form calcium hydroxide when the sample is collected.

From these results, it is possible to produce a calcined shell fine-particle powder (mainly composed of calcium oxide) in a nanometer order from a pulverized shell powder (calcium carbonate) by using thermal plasma.

The results of an antibacterial test of calcined shell fine particles in a nanometer order produced by the method for producing a fine-particle powder according to the first exemplary embodiment are illustrated in Table 1 of FIG. 5. The antibacterial test of the produced calcined shell fine particles in a nanometer order was conducted as follows. *Escherichia coli* was suspended in 0.85% physiological saline to prepare a bacterial suspension of approximately $10^9$ cfu/mL. In a beaker, 200 mL of sterilized pure water was placed, and 0.5 mg/mL of the produced calcined shell fine-particle powder was added while stirring was performed. After the pH was stabilized, the bacterial suspension was added, samples were collected after 0, 20, 60, and 180 seconds and cultured for one day, and then the viable cell count per 1 mL was measured. As a result of the antibacterial test, the pH was 12.1, showing significantly high alkalinity, and the viable cell count was $1.3\times10^2$ cfu/mL 180 seconds after the addition of bacterial suspension. By this, it has been confirmed that the calcined shell fine particles produced from shells by thermal plasma exhibit a significantly strong sterilization effect in a short time. A calcined shell particle powder with a size of several micrometers, which had almost the same antibacterial activity as that of the calcined shell fine particles produced this time, was kneaded into a resin mainly composed of polypropylene at a concentration of 3 wt %, and subjected to the antibacterial test. As a result, the viable cell count after 6 hours has been less than or equal to $1.6\times10^0$ cfu/mL, which is the detection limit, and a high antibacterial effect has been confirmed when the calcined shell fine-particle powder is kneaded into a resin as well.

Therefore, a desired antibacterial effect can be acquired from a resin composition or resin molded article containing calcined shell fine-particle powder produced by thermal plasma. In the case of being kneaded into a resin, the calcined shell fine-particle powder can be mixed at less than or equal to 3 wt % to acquire a sufficient antibacterial effect. In particular, in the case of being mixed into a transparent resin as well, the calcined shell fine-particle powder can be mixed while the transparency is maintained as long as the powder is mixed at less than or equal to 3 wt %.

This time, the calcined shell fine-particle powder has been kneaded into a resin mainly composed of polypropylene, but as the resin, a resin mainly composed of polyethylene, polystyrene, acryl, methacryl, polyethylene terephthalate (PET), polycarbonate, or the like may be used.

First Example

In First Example, multiphase AC arc plasma was used as the thermal plasma. Since the melting point and boiling point of calcium oxide, which is the main component of the calcined shell fine-particle powder to be produced, are as high as 2613° C. and 2850° C., respectively, multiphase AC arc plasma, which has a relatively high plasma temperature among thermal plasmas and has a wide high temperature region, is adopted to improve productivity and decrease production costs. Since a pulverized shell powder, which is an industrial waste, is used as a raw material, the pulverized shell powder may contain a large amount of impurities, and the raw material composition may vary greatly. In that case as well, it is advantageous to use multiphase AC arc plasma, which easily maintains the thermal plasma discharge and is resistant to disturbances caused by gases and impurities.

Multiphase AC arc plasma has been used this time, but DC arc discharge, radio frequency inductively coupled plasma (ICP), and the like may be used as the thermal plasma. The use of DC arc discharge has the potential to further decrease production costs since the thermal plasma can be generated by a simpler apparatus. The use of radio frequency inductively coupled plasma has the potential to produce high-quality fine particles containing fewer impurities than the particles produced using multiphase AC arc plasma since the discharge unit is covered with a quartz tube.

In the method for producing a fine-particle powder containing calcium oxide or calcium hydroxide according to Example 1, by utilizing the thermal plasma treatment in this way, the high-temperature calcination at equal to or more than 1000° C. can be completed in a short time and fine particles of less than or equal to 100 nanometers can be produced at the same time. Since evaporation and chemical reactions take place in the gas phase, impurities are rarely mixed, and high material properties such as high antibacterial effects can be acquired. One of the great advantages is that various material designs such as oxidation, reduction, nitridation, carbonization, and coating on the outermost surface are possible depending on the type of gas. Since a nanoparticle powder can be produced by a dry method in which a solution and the like are not used, there is an advantage that the powder can be produced without a long step such as a drying step when embedded in a resin. Since excess organic components (impurities) adhered to the shells are also volatilized by the thermal plasma treatment, it is possible to simplify the pretreatment washing of the pulverized shell powder.

Furthermore, by utilizing particles of less than or equal to 100 nanometers having a high antibacterial effect as an antibacterial agent to be embedded in a resin, the same level of antibacterial effect can be acquired in a smaller addition amount of the particles than the addition amounts of conventional antibacterial materials. For this reason, transparency can be maintained when the antibacterial material is added to a transparent sheet or film, and it is thus possible to impart an antibacterial effect to transparent resin sheets for prevention of droplet infection, transparent protective films for food packaging materials, touch panels and the like, and the like, which are currently in high demand.

By appropriately combining discretionary exemplary embodiments or modifications among the various exemplary embodiments or modifications described above, it is possible to achieve the effect possessed by each of them. Combination of exemplary embodiments, combination of examples, or combination of exemplary embodiments and examples are possible, and combination of features in different exemplary embodiments or examples are also possible.

INDUSTRIAL APPLICABILITY

According to the method for producing a fine-particle powder containing calcium oxide or calcium hydroxide of the present invention, a high-quality fine-particle powder containing calcium oxide or calcium hydroxide can be produced by a dry process without using a solution and performing complicated steps. A fine-particle powder containing calcium oxide or calcium hydroxide having a high antibacterial effect can be produced at a low cost. For this reason, the fine-particle powder containing calcium oxide or calcium hydroxide obtained by the method for producing a fine-particle powder containing calcium oxide or calcium hydroxide according to the present invention is useful as an antibacterial material that is kneaded into a resin such as a transparent resin sheet or film to impart an antibacterial effect while maintaining transparency.

REFERENCE MARKS IN THE DRAWINGS

1 reaction chamber
2 thermal insulating member
3 fine particle collection unit
4 electrode
5, 5-1 to 5-6 AC power source
6 pressure adjustment valve
7 exhaust pump
8 electrode drive device
10 material supply apparatus
11 material supply pipe
12 material supply port
14 discharge gas supply pipe
15 cooling gas supply pipe
16 arc discharge (thermal plasma)
17 material particle
18 fine particle
20 fine particle production apparatus
101 wet pulverizer
102 slurry tank (circulation tank)
103 circulation pump
104 stirrer
105 slurry inlet
106 slurry outlet
107 pulverization chamber
108 stirring unit
109 gap separator

The invention claimed is:

1. A fine-particle powder containing calcium oxide or calcium hydroxide, wherein the fine-particle powder is composed of primary particles, a particle size of the primary particles is from 5 nm to 300 nm inclusive and a specific surface area of the entire fine-particle powder is equal to or more than 18 $m^2/g$.

2. A resin composition comprising:

the fine-particle powder containing calcium oxide or calcium hydroxide according to claim 1; and a resin containing the fine-particle powder.

3. A resin molded body comprising:

the fine-particle powder containing calcium oxide or calcium hydroxide according to claim 1; and a resin containing the fine-particle powder.

4. A transparent resin molded body of a sheet form comprising:

the fine-particle powder containing calcium oxide or calcium hydroxide according to claim 1; and a resin containing the fine-particle powder.

5. A fine-particle powder containing calcium oxide or calcium hydroxide according to claim 1, wherein the primary particles are spherical particles having a smooth surface shape.

6. A fine-particle powder containing calcium oxide or calcium hydroxide according to claim 1, wherein the fine-particle powder is a fine particle powder derived from seashells or eggshells.

7. A fine-particle powder containing calcium oxide or calcium hydroxide, wherein the fine-particle powder is composed of primary particles, a particle size of the primary particles is from 5 nm to 300 nm inclusive, and a specific surface area of the entire fine-particle powder is equal to or more than 18 $m^2/g$, wherein the primary particles are spherical particles having a smooth surface shape, and the fine-particle powder is a fine particle powder derived from seashells or eggshells.

* * * * *